United States Patent
Garcia et al.

(10) Patent No.: US 11,285,545 B2
(45) Date of Patent: Mar. 29, 2022

(54) COATED CUTTING TOOL

(71) Applicant: SANDVIK INTELLECTUAL PROPERTY AB, Sandviken (SE)

(72) Inventors: Jose Luis Garcia, Stockholm (SE); Jeanette Persson, Nacka (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 128 days.

(21) Appl. No.: 16/491,632

(22) PCT Filed: Mar. 7, 2018

(86) PCT No.: PCT/EP2018/055606
§ 371 (c)(1),
(2) Date: Sep. 6, 2019

(87) PCT Pub. No.: WO2018/162558
PCT Pub. Date: Sep. 13, 2018

(65) Prior Publication Data
US 2021/0129229 A1    May 6, 2021

(30) Foreign Application Priority Data
Mar. 9, 2017  (EP) ..................... 17160083

(51) Int. Cl.
*B23B 27/14* (2006.01)
*B23C 5/16* (2006.01)
*C23C 28/04* (2006.01)
*C22C 29/08* (2006.01)

(52) U.S. Cl.
CPC .............. *B23B 27/148* (2013.01); *B23C 5/16* (2013.01); *C22C 29/08* (2013.01); *C23C 28/042* (2013.01); *C23C 28/044* (2013.01); *B23B 2224/04* (2013.01)

(58) Field of Classification Search
CPC ......... B23B 5/16; B23B 27/14; B23B 27/148; B23B 2224/04; C23C 28/042; C23C 28/044; C22C 29/08
USPC .......... 51/307, 309; 428/325, 216, 336, 698, 428/701, 702
See application file for complete search history.

(56) References Cited

U.S. PATENT DOCUMENTS

| | | | |
|---|---|---|---|
| 4,843,039 A * | 6/1989 | Akesson | C22C 29/06 428/698 |
| 5,135,801 A | 8/1992 | Nystroem et al. | |
| 5,235,879 A * | 8/1993 | Drougge | C22C 29/08 407/119 |
| 5,418,049 A | 5/1995 | Drougge | |
| 5,453,241 A * | 9/1995 | Akerman | C23C 8/20 419/14 |
| 6,080,477 A * | 6/2000 | Narasimhan | C23C 8/02 428/336 |
| 6,413,628 B1 * | 7/2002 | Narasimhan | C23C 16/36 428/325 |
| 2002/0051886 A1 | 5/2002 | Blomstedt et al. | |
| 2008/0029310 A1 | 2/2008 | Stevens et al. | |
| 2010/0098506 A1 * | 4/2010 | Tanaka | C22C 29/08 407/119 |
| 2010/0101368 A1 * | 4/2010 | Fang | C22C 29/08 75/240 |
| 2011/0171444 A1 | 7/2011 | Elkouby et al. | |
| 2013/0118308 A1 * | 5/2013 | Fang | C22C 29/02 75/240 |
| 2014/0023546 A1 * | 1/2014 | Konyashin | B22F 7/008 419/18 |
| 2019/0010583 A1 * | 1/2019 | Kesson | B22F 5/00 |

FOREIGN PATENT DOCUMENTS

| | | | |
|---|---|---|---|
| JP | 07-173608 | * | 7/1995 |
| WO | 2010045257 A1 | | 4/2010 |

* cited by examiner

*Primary Examiner* — Archene A Turner
(74) *Attorney, Agent, or Firm* — Corinne R. Gorski

(57) ABSTRACT

A coated cutting tool includes a substrate of cemented carbide and a coating. The cemented carbide is made of WC and a binder phase of one or more of Co, Fe and Ni. The carbon content in the cemented carbide is a substoichiometric carbon content SCC, wherein −0.13 wt %≤SCC<0 wt %, or −0.30 wt %≤SCC≤−0.16 wt %. The coating includes one or more layers being a metal carbide, metal nitride or metal carbonitride, the metal being at least one of Zr and Hf, and wherein Ti is present in an amount of at most 10 at-% of the amount metal. The one or more layers is situated between the substrate and the aluminum oxide layer.

15 Claims, No Drawings

COATED CUTTING TOOL

RELATED APPLICATION DATA

This application is a § 371 National Stage Application of PCT International Application No. PCT/EP2018/055606 filed Mar. 7, 2018 claiming priority to EP 17160083.6 filed Mar. 9, 2017.

The present invention relates to a coated cutting tool.

INTRODUCTION

Cutting tools for metal machining are commonly based on cemented carbide which usually has a comparatively thin coating deposited for the purpose of generally improving wear resistance of the cutting tool and thus increase tool life. Numerous coatings are known in the art and a coating can be made of combinations of layers of different compositions and thicknesses.

During intermittent machining, especially in milling operations, thermo-mechanically induced cracks called "comb cracks" are commonly formed in the substrate at the cutting edge. These cracks eventually lead to failure of the tool by chipping, being the rate limiting factor for tool life.

In CVD coatings cooling cracks are formed during cooling after deposition since the coating cannot contract freely because it is attached to the cemented carbide body. The cooling cracks may act as nucleation sites for formation of comb cracks in the substrate. At the same time cooling cracks are formed tensile stresses are induced in the coating. Thus, one way known in the art to increase the resistance to comb crack formation is to delay the crack formation and crack propagation in the coating by introducing compressive stresses in the coating by blasting.

Definitions

By eta phase is herein meant sub-carbides selected from $Me_{12}C$ and $Me_6C$ where Me is selected from W, Mo and one or more of the binder phase metals Co, Fe and Ni. Common sub-carbides are $W_6Co_6C$, $W_3Co_3C$, $W_6Ni_6C$, $W_3Ni_3C$, $W_6Fe_6C$, $W_3Fe_3C$.

THE INVENTION

It has now surprisingly been found that a coated cutting tool having excellent resistance to the formation of comb cracks particularly in milling operations can be provided.

The invention relates to a coated cutting tool comprising a substrate of cemented carbide and a coating, the cemented carbide comprising WC and a binder phase comprising one or more of Co, Fe and Ni, the carbon content in the cemented carbide is a substoichiometric carbon content, herein denoted SCC, wherein −0.13 wt %≤SCC<0 wt %, or −0.30 wt %≤SCC≤−0.16 wt %, and wherein the coating comprising one or more layers (A) being a metal carbide, metal nitride or metal carbonitride, the metal being at least one of Zr and Hf, optionally Ti is present in an amount of at most 10 at-% of the amount metal, and an aluminum oxide layer, the one or more layers (A) being situated between the substrate and the aluminum oxide layer.

The optional presence of Ti in the metal carbide, metal nitride or metal carbonitride of the coating means that the amount Ti can also be said being present in an amount of 0-10 at-% of the amount metal.

The cemented carbide in the present invention has a substoichiometric carbon content SCC within certain ranges. Substoichiometric carbon content is a measure of the carbon content in relation to the stoichiometric value of carbon. The substoichiometric carbon content value is a good measurement to use since it is not dependent on other parameters like binder phase content, other carbides etc.

The stoichiometric carbon content on the other hand is dependent on other parameters like binder phase content etc. For a powder, prior to sintering, the stoichiometric value is calculated by assuming that the WC is completely stoichiometric, i.e. that the atomic ratio W:C is 1:1. If other carbides are present, also those are assumed to be stoichiometric.

When the stoichiometric carbon content is estimated on a sintered cemented carbide, e.g. consisting of Co and WC, it can either be done based on the amount of added WC raw material, assuming that the atomic ratio W:C is 1:1, or, from measurements on the sintered material, and then from the measured tungsten content calculate the stoichiometric carbon content assuming that the atomic ratio W:C is 1:1.

This means that the term substoichiometric carbon content, SCC, as used herein is the total carbon content (in wt %) determined from chemical analysis minus the calculated stoichiometric carbon content (in wt %) based on WC and possible further carbides present in the cemented carbide.

As an example, if the stoichiometric carbon content for a particular cemented carbide is 5.60 wt %, and the same cemented carbide would be made, but with a carbon content of 5.30 wt %, the substoichiometric carbon would be −0.30 wt %.

The binder phase is selected from one or more of Fe, Co and Ni, preferably Co, in an amount of 2 to 20 wt % of the cemented carbide, or between 5 to 12 wt % of the cemented carbide.

In one embodiment, when Cr is present in the cemented carbide, some of the Cr is dissolved in the binder phase.

The amount of WC in the cemented carbide is suitably from 80 to 98 wt %. The grain size (FSSS) of the WC in the raw material powder prior to sintering is suitably between 0.1 and 12 µm, or between 0.4 to 9 µm.

In one embodiment of the present invention, the cemented carbide also comprises Mo in an amount of from 0.5 to 20 wt %, or 0.8 to 5 wt %.

The cemented carbide can also comprise other constituents common in the art of cemented carbides, e.g. carbides, carbonitrides or nitrides of one or more of Ti, Ta, Nb, Cr, Mo, Zr or V.

The cemented carbide of the invention can be made according to the following steps:
providing powders forming hard constituents
providing powders selected form Co, Fe and Ni forming the binder phase
providing a milling liquid,
milling, drying, pressing and sintering the powders into a cemented carbide,
wherein one or more of W, $W_2C$, Mo or $Mo_2C$ is added in such amounts that there is a substoichiometric carbon content, SCC, in the sintered cemented carbide and −0.13 wt %≤SCC<0 wt % or −0.30 wt %≤SCC≤−0.16 wt %.

To achieve the correct carbon content in the final sintered cemented carbide manufacturing, one or more of W, $W_2C$, Mo or $Mo_2C$ is added.

In one embodiment one or more of W and $W_2C$ is added.
In one embodiment the one or more of W, $W_2C$, Mo or $Mo_2C$ powders is pre-milled prior to the addition to the other raw materials.

The exact amount of W, $W_2C$, Mo or $Mo_2C$ depends on the composition of the other raw materials.

Usually some carbon is lost during sintering due to the presence of oxygen. The oxygen will react with carbon and leave as CO or $CO_2$ during sintering thus shifting the carbon balance so that the added amount of one or more of W, $W_2C$, Mo or $Mo_2C$ has to be adjusted. Exactly how much carbon that is lost during sintering depends on the raw material and production techniques used and it is up to the skilled person in the art to adjust the W, $W_2C$, Mo or $Mo_2C$ additions so that the aimed substoichiometric carbon content in the sintered material is achieved.

The stoichiometric carbon content in the cemented carbide can be determined by first measuring the total carbon content in a sample, for example by using a LECO WC-6500 instrument. The cobalt content is also measured, for example by X-ray fluorescence analysis. By subtracting the cobalt and carbon amounts from the total weight of the sample the tungsten content is given which is then used to calculate the stoichiometric carbon content assuming the WC has a 1:1 ratio.

The powders forming hard constituents are selected from WC and other constituents common in the art of cemented carbides, e.g. carbides, carbonitrides or nitrides of one or more of Ti, Ta, Nb, Cr, Mo, Zr or V.

In one embodiment the amount of WC added is between 80 and 98 wt % based on dry powder weight. The grain size (FSSS) of the WC powder is suitably between 0.1 and 12 µm, or between 0.4 to 9 µm.

In one embodiment the powders forming hard constituents are WC.

In one embodiment at least one part of the powders forming hard constituents are added as a powder fraction made from recycled cemented carbide scrap, comprising mainly the elements W, C and Co.

The powders forming the binder phase are one or more of Co, Ni or Fe, or alloys thereof. The powders forming the binder phase are added in an amount of 2 to 20 wt %, or between 5 to 12 wt % based on the dry powder weight.

The slurry comprising powders forming hard constituents and powders forming the binder phase are suitably mixed by a milling operation, either in a ball mill or attritor mill. Any liquid commonly used as a milling liquid in conventional cemented carbide manufacturing can be used. The slurry containing the powdered materials are then dried, suitably forming agglomerated granules.

Green bodies are subsequently formed from the dried powders/granules by a pressing operation such as uniaxial pressing, multiaxial pressing etc.

The green bodies formed from the powders/granules made are subsequently sintered according to any conventional sintering methods e.g. vacuum sintering, Sinter HIP, spark plasma sintering, gas pressure sintering (GPS) etc. The sintering temperature is typically between 1300 and 1580° C., or between 1360 and 1450° C.

In one embodiment, the cemented carbide has a substoichiometric carbon content $-0.13$ wt %$\leq$SCC$<0$ wt %, or $-0.13$ wt %$\leq$SCC$\leq-0.05$ wt %, or $-0.12$ wt %$\leq$SCC$\leq-0.10$ wt %. In this embodiment the cemented carbide is free from at least agglomerates of eta phase, alternatively free from eta phase in any form.

In one embodiment, the cemented carbide has a substoichiometric carbon content $-0.30$ wt %$\leq$SCC$<-0.16$ wt %, or $-0.28$ wt %$\leq$SCC$\leq-0.17$ wt %. In this embodiment the cemented carbide comprises eta phase comprising $M_{12}C$ and/or $Me_6C$ carbides where Me is one or more metals selected from W, Mo and the binder phase metals. The cemented carbide according to this embodiment has such a low carbon content so that eta phase is formed. This will result in a cemented carbide having both a high W content in the binder and eta phase. The eta phase formed is, however, not present as agglomerates.

Commonly, eta phase has been considered as unwanted in cemented carbide due to that it has traditionally been present in large agglomerates of eta phase grains which are brittle and detrimental to the cemented carbide properties. However, by providing the non-agglomerated eta phase by selecting a certain range of substoichiometric carbon content as in the cemented carbide of this embodiment, the cemented carbide shows good properties. The eta phase is present in the microstructure as a fine dispersed phase.

Common carbides of the eta phase are $W_6Co_6C$, $W_3Co_3C$, $W_6Ni_6C$, $W_3Ni_3C$, $W_6Fe_6C$, $W_3Fe_3C$.

In one embodiment the eta phase comprises both $Me_2C$ and $Me_6C$.

In one embodiment the eta phase comprises >90 vol % $Me_2C$, as estimated from XRD measurements.

In one embodiment the eta phase is free from Mo.

In yet another embodiment the eta phase contains Mo. If Mo is present in the cemented carbide, the Mo will replace some of the tungsten in the eta phase.

The average grain size of the eta phase is suitably between 0.1 to 10 µm, or between 0.5 to 3 µm.

The distribution of the eta phase should be as even as possible.

In one embodiment, the volume fraction of the eta phase in the cemented carbide is suitably between 2 and 10 vol %, or between 4 and 8 vol %, or between 4 and 6 vol %.

In one embodiment, the eta phase distribution is the same throughout the whole cemented carbide substrate. By that is herein meant that the cemented carbide does not comprise any gradients or zones without eta phase, like e.g. in U.S. Pat. No. 4,843,039.

In order to be able to achieve the well distributed eta phase which is necessary to obtain the improved resistance against comb cracks, achieving the correct carbon content is essential. The eta phase needs to be well distributed in a suitable amount. This is achieved by controlling the carbon balance carefully during manufacturing.

If the carbon content in the sintered cemented carbide is too low, i.e. lower than $-0.30$ wt % substoichiometric carbon content, the amount of eta phase becomes too large and the particle size increases considerably so the cemented carbide will be brittle. On the other hand, if the carbon content is higher than $-0.16$ wt % substoichiometric carbon content but still in the eta phase forming region, the formed eta phase will be unevenly distributed like in large agglomerates leading to a decrease in toughness of the cemented carbide.

The difference in substoichiometric carbon content between achieving the unwanted large agglomerates of eta phase, and achieving the finely distributed eta phase, that it is aimed for, can be very small. Being close to that limit requires monitoring the microstructure to make sure that the unwanted large agglomerates are avoided. Carefully adjusting carbon contents and then monitor its result in terms of the obtained microstructure is a known working procedure to a person skilled in the art.

The cemented carbide of this embodiment should have an evenly distributed eta phase, by that is herein meant that the cemented carbide is free from large agglomerates.

In the metal carbide, metal nitride or metal carbonitride of the coating, Ti is optionally present in suitably an amount of at most 7 at-% of the amount metal, or at most 5 at-% of the amount metal, or at most 1 at-% of the amount metal.

In other words, in the metal carbide, metal nitride or metal carbonitride of the coating the amount Ti is suitably present in an amount of 0-7 at-% of the amount metal, or 0-5 at-% of the amount metal, or 0-1 at-% of the amount metal.

The one or more layers (A) is suitably at least one of (Zr,Hf,Ti)(C,N), (Zr,Hf,Ti)C and (Zr,Hf,Ti)N, wherein one or both of Zr and Hf is present and Ti is optional, the content of Ti being 0-10 at %, or 0-7 at %, or 0-5 at %, or 0-1 at %, of the amount metal.

The one or more layers (A) can be produced by any suitable CVD process, for example MT-CVD, HT-CVD and plasma-CVD. The MT-CVD process or plasma-CVD process are preferably used due to that they are run at a lower temperature than HT-CVD which minimizes diffusion of carbon from the substrate into the coating. For (Zr,Hf,Ti)(C,N) the MT-CVD process or plasma-CVD process is preferably used.

In one embodiment the one or more layers (A) is at least one of (Zr,Ti)C, (Zr,Ti)N, (Zr,Ti)(C,N), (Hf,Ti)C, (Hf,Ti)N, and (Hf,Ti)(C,N), the content of Ti being 0-10 at %, or 0-7 at %, or 0-5 at %, or 0-1 at %, of the amount metal.

In one embodiment the one or more layers (A) is at least one of ZrC, ZrN, Zr(C,N), HfC, HfN, and Hf(C,N).

In one embodiment the one or more layers (A) is one ZrC, ZrN, Zr(C,N), HfC, HfN, or Hf(C,N) layer.

In one embodiment, the one or more layers (A) is one ZrC, Zr(C,N), HfC, or Hf(C,N) layer.

In one embodiment, the one or more layers (A) is one Zr(C,N) or Hf(C,N) layer, preferably one Zr(C,N) layer.

The one or more layers (A) suitably have a coefficient of thermal expansion CTE of between 6 and 8 $[10^{-6}/K]$, or between 6.5 and 7.5 $[10^{-6}/K]$.

The coefficient of thermal expansion CTE is a material-specific property and values for different materials can be found in literature, e.g., Friedrich et al., "Datensammlung zu Hartstoffeigenschaften", Materialwissenschaft und Werkstofftechnik, 28 (1997), p. 59-76.

The total thickness of the one or more layers (A) is suitably from 2 to 15 μm, or from 2 to 12 μm, or from 2.5 to 8 μm, or from 2.5 to 5 μm.

The total thickness of the aluminum oxide layer is suitably from 1 to 5 μm, or from 2 to 4 μm.

The total thickness of the whole coating is suitably from 3 to 20 μm, or from 4 to 15 μm, or from 5 to 12 μm.

The ratio of thickness of the one or more layers (A) and the thickness of the aluminum oxide layer is suitably more than or equal to 1.

In one embodiment the coated cutting tool comprises adjacent the surface of the substrate a layer of Ti($C_xN_yO_z$) or Zr($C_xN_yO_z$), or Hf($C_xN_yO_z$), x+y+z=1, 0≤x≤1, 0≤y≤1, 0≤z<1, being from 0.05 to 1.5 μm, or from 0.05 to 1 μm.

In one embodiment the coated cutting tool comprises adjacent the surface of the substrate a layer of TiC, TiN, HfC, HfN, ZrC or ZrN being from 0.05 to 1.5 μm, or from 0.05 to 1 μm.

In one embodiment the coated cutting tool comprises adjacent the surface of the substrate a layer of TiN, HfN or ZrN being from 0.05 to 1.5 μm, or from 0.05 to 1 μm.

In one embodiment the coated cutting tool comprises adjacent the surface of the substrate a layer of TiC, TiN, HfC, HfN, ZrC or ZrN being from 0.05 to 1.5 μm, or from 0.05 to 1 μm, followed by one or more layers (A).

In one embodiment the coated cutting tool comprises adjacent the surface of the substrate a layer of TiC, TiN, HfC, HfN, ZrC or ZrN being from 0.05 to 1.5 μm, or from 0.05 to 1 μm, followed by one ZrC, Zr(C,N), HfC, or Hf(C,N) layer.

The Zr(C,N) and Hf(C,N) layers can be produced by any type of CVD process, for example MT-CVD, HT-CVD and plasma-CVD. The MT-CVD process or plasma-CVD process are preferably used due to that they are run at a lower temperature than HT-CVD which minimizes diffusion of carbon from the substrate into the coating.

A bonding layer (B) having a thickness of 0.05 to 2 μm is suitably present between the uppermost of the one or more layers (A) and the aluminum oxide layer, the bonding layer (B) being Ti($C_xN_yO_z$) or Zr($C_xN_yO_z$), or Hf($C_xN_yO_z$), x+y+z=1, 0<x<1, 0≤y<1, 0<z<1. When the one or more layers (A) is a MT-CVD Zr(C,N) or MT-CVD Hf(C,N) layer, i.e., using a nitrile such as $CH_3CN$ as one reaction gas, then optionally the bonding layer (B) further includes a layer of HT-Ti(C,N), HT-Zr(C,N) or HT-Hf(C,N), suitably 0.05 to 1 μm thick, on top of the MT-CVD Zr(C,N) or MT-CVD Hf(C,N) layer.

In one embodiment, the aluminum oxide layer is an alpha aluminum oxide layer.

In one embodiment the aluminum oxide layer is a kappa aluminum oxide layer.

The coated cutting tool is preferably a milling insert.

EXAMPLES

Example 1

Three different cemented carbide bodies of geometry R365-1505ZNE-KM were provided made from raw material powders according to Table 1.

TABLE 1

| Cemented carbide | Co (wt %) | WC (wt %) | WC grain size (μm) (FSSS) | W addition (wt %) | C addition (wt %) | Substoichiometric carbon content in powder (wt %) |
|---|---|---|---|---|---|---|
| No. 1 | 6.0 | balance | 1.3 | — | 0.07 | +0.08 |
| No. 2 | 6.0 | balance | 1.4 | — | 0.01 | 0.00 |
| No. 3 | 7.4 | balance | 1.4 | 1.88 | 0.02 | −0.13 |

The samples No. 1, No. 2 and No. 3 were made milling together the powders in a ball mill for 8 hours, together with a milling liquid (water/ethanol with a ratio of 9/91) and an organic binder, 2 wt % PEG (the amount of PEG is not included in the dry powder weight). Then the slurry was pan dried. The agglomerates were then pressed into a green body which then was sintered at 1410° C.

The sintered pieces of samples No. 1 and No. 2 were found not to contain any eta phase. Sample No. 3 was found to contain eta phase but then in a well-dispersed form without clusters. The amount of eta phase was determined by image analysis using the software Image J using the setup "Automatic". The images used for the analysis was LOM images with a magnification of 1000× and 2000×. Two measurements were made at each magnification and the value in Table 2 for sample No. 3 is an average value of all these.

The stoichiometric carbon content in the sintered materials was further calculated by first measuring the total carbon content by using a LECO WC-600 instrument, for this analysis, the sample was crushed prior to the analysis. The accuracy of the values is ±0.01 wt %. The Co content is measured with XRF (X-ray fluorescence) using a Panalytical Axios Max Advanced instrument. By subtracting the cobalt and carbon amounts from the total weight of the sample, the W content is achieved which is used to calculate the stoichiometric carbon content, assuming the WC has a 1:1 ratio.

By subtracting the stoichiometric carbon content from the total carbon content as measured by the LECO WC-600 instrument, the substoichiometric carbon content is achieved. As can be seen in Table 2, the substoichiometric carbon content in the sintered materials differs from that in the respective powder. This is due to that some part of the carbon reacts with oxygen, which is an impurity in the raw materials, which outgas as CO or $CO_2$ during sintering, and reduces the total final C content of the alloy.

TABLE 2

| Cemented carbide | Substoichiometric carbon content in sintered body (wt %) | Vol % eta phase |
|---|---|---|
| No. 1 | −0.09 | 0 |
| No. 2 | −0.13 | 0 |
| No. 3 | −0.20 | 4.8 |

Example 2

Cemented carbide inserts No. 1 with geometry R365-1505ZNE-KM made in Example 1 were then coated with a 3 μm Ti(C,N) layer followed by a 3 μm alpha-$Al_2O_3$ layer.

A thin (0.5 μm) bonding layer of TiN between the substrate and the Ti(C,N) layer was first provided. The TiN bonding layer was deposited by using a reaction gas mixture comprising $N_2$, $TiCl_4$ and $H_2$.

The deposition of the Ti(C,N) layer was made in a CVD reactor based on general procedures well known in the art using a reaction gas mixture comprising H2, N2, HCl, $TiCl_4$ and $CH_3CN$ at a deposition temperature of 885° C. and at a pressure of 55 mbar. Furthermore, a thin (0.5 μm) bonding layer of Ti(C,O) between the Ti(C,N) layer and the alpha-$Al_2O_3$ layer was provided. The TiCO bonding layer was deposited by using a reaction gas mixture comprising $H_2$, $TiCl_4$ and CO. After deposition, the Ti(C,O) layer was slightly oxidized in a gas mixture comprising CO and $CO_2$ before depositing the alpha-$Al_2O_3$ layer.

Further, cemented carbide inserts No. 1, No. 2 and No. 3 with geometry R365-1505ZNE-KM made in Example 1 were coated with a 3 μm Zr(C,N) layer followed by a 3 μm alpha-$Al_2O_3$ layer.

The deposition of the Zr(C,N) layer was made according to general procedures (MT-CVD) in a Bernex™ 325 reactor using a reaction gas mixture comprising 64.9 vol % $H_2$, 33.2 vol % $N_2$, 1.3 vol % $ZrCl_4$ and 0.6 vol % $CH_3CN$ at a deposition temperature of 930° C. and at a pressure of 55 mbar. The total gas flow was 2880 l/h.

Before depositing the Zr(C,N) layer a thin (0.5 μm) bonding layer of TiN was deposited between the substrate and the Zr(C,N) layer.

Before depositing the alpha-$Al_2O_3$ layer a thin (1 μm) bonding layer comprising of a sequence of HT-CVD Ti(C,N) and Ti(C,N,O) between the Zr(C,N) layer and the alpha-$Al_2O_3$ layer was provided. The deposition of the HT-CVD Ti(C,N) layer was made based on general procedures well known in the art using a reaction gas mixture comprising $H_2$, $N_2$, HCl, $TiCl_4$ and $CH_4$ at a deposition temperature of 1000° C. The deposition of the Ti(C,N,O) layer was also made based on known procedures using a reaction gas mixture comprising $H_2$, $N_2$, HCl, $TiCl_4$, $CH_3CN$ and CO at a deposition temperature of 1000° C. After deposition, the Ti(C,N,O) layer was slightly oxidized in a gas mixture comprising CO and $CO_2$ before depositing the alpha-$Al_2O_3$ layer.

The deposition of the alpha-$Al_2O_3$ layer was then made based on general procedures well known in the art using a reaction gas mixture in a nucleation step comprising H2, HCl, $CO_2$ and $AlCl_3$ and further using a reaction gas mixture in a growth step comprising $H_2$, HCl, $CO_2$, $AlCl_3$ and $H_2S$, at a deposition temperature of about 1000° C. and a pressure of 55 mbar.

The samples of coated cemented carbides are summarized in Table 3.

TABLE 3

| Sample No. | Cemented carbide | Coating |
|---|---|---|
| 1 | No. 1 | Ti(C,N)/alpha-$Al_2O_3$ |
| 2 | No. 1 | Zr(C,N)/alpha-$Al_2O_3$ |
| 3 | No. 2 | Zr(C,N)/alpha-$Al_2O_3$ |
| 4 | No. 3 | Zr(C,N)/alpha-$Al_2O_3$ |

Example 3

Samples 1 to 4 of coated cemented carbides according to Example 2 were tested in a face milling operation (roughing operation) of a motor block of grey cast iron SS0125 under dry conditions with the following cutting parameters:

Vc: 362 m/min
Fz: 0.29 mm/rev
ap: 5 mm
ae: 20 mm
Cutter: R365-100Q32W15H
Number of teeth: 14 (13 milling inserts +1 wiper insert)
Machine: Horizontal multi-operational (GROB)
Taper: HSK100

The number of inserts of each sample tested in a tool body was 6, 7 or 13. The same milling cutter was used when testing the different inserts and the cutter was always mounted with in total 14 inserts also when 6 or 7 sample inserts were mounted. Each insert of samples 1 to 4 was thus subjected to the same conditions in the tests.

For each test 100 components were made (corresponding to about 70 min milling time). The number of comb cracks larger than 0.2 mm per insert was then counted and an average for all sample inserts used in the same milling cutter was calculated.

TABLE 4

| Sample | Combination substrate-coating | Substoichiometric carbon content in substrate (wt %) | Number of sample inserts per cutter | Average number of comb cracks (>0.2 mm) |
|---|---|---|---|---|
| 1 | No. 1 - Ti(C,N)/$Al_2O_3$ | −0.09 | 13 | 9.0 |
| 2 | No. 1 - ZrCN/$Al_2O_3$ | −0.09 | 13 | 6.4 |
| 3 | No. 2- Zr(C,N)/$Al_2O_3$ | −0.13 | 6 | 4.7 |
| 4 | No. 3 - Zr(C,N)/$Al_2O_3$ | −0.20 | 7 | 4.7 |

The invention claimed is:
1. A coated cutting tool comprising:
a substrate of cemented carbide; and a coating, the cemented carbide comprising WC and a binder phase comprising one or more of Co, Fe and Ni, a carbon content in the cemented carbide being a substoichiometric carbon content SCC, wherein −0.30 wt %≤SCC≤−0.16 wt %, wherein the cemented carbide comprises an eta phase, a distribution of the eta phase being the same throughout an entirety of the cemented carbide substrate, and wherein the coating includes one or more layers of a metal carbide, metal nitride or metal carbonitride, the metal being at least one of Zr and Hf, and an aluminum oxide layer, the one or more layers being situated between the substrate and the aluminum oxide layer.

2. The coated cutting tool according to claim 1, wherein the one or more layers is at least one of ZrC, ZrN, Zr(C,N), HfC, HfN, and Hf(C,N).

3. The coated cutting tool according to claim 1, wherein the one or more layers is a Zr(C,N) or Hf(C,N) layer.

4. The coated cutting tool according to claim 1, wherein the one or more layers has a coefficient of thermal expansion CTE of between 6 and 8 $10^{-6}$/K.

5. The coated cutting tool according to claim 1, wherein a total thickness of the one or more layers is from 2 to 15 μm.

6. The coated cutting tool according to claim 1, wherein a total thickness of the aluminum oxide layer is from 1 to 5 μm.

7. The coated cutting tool according to claim 1, wherein a ratio of thickness of the one or more layers and a thickness of the aluminum oxide layer is more than or equal to 1.

8. The coated cutting tool according to claim 1, further comprising, adjacent the surface of the substrate, a layer of Ti($C_xN_yO_z$) or Zr($C_xN_yO_z$), or Hf($C_xN_yO_z$), x+y+z=1, 0≤x≤1, 0≤y≤1, 0≤z<1, being from 0.05 to 1.5 μm.

9. The coated cutting tool according to claim 1, wherein a bonding layer having a thickness of 0.05 to 2 μm is present between an uppermost layer of the one or more layers and the aluminum oxide layer, the bonding layer being Ti($C_xN_yO_z$) or Zr($C_xN_yO_z$), or Hf($C_xN_yO_z$), x+y+z=1, 0<x<1, 0≤y<1, 0<z<1.

10. The coated cutting tool according to claim 9, wherein the bonding layer is Ti($C_xN_yO_z$), x+y+z=1, 0<x<1, 0≤y<1, 0<z<1.

11. The coated cutting tool according to claim 1, wherein the substoichiometric carbon content SCC in the cemented carbide is −0.28 wt %≤SCC≤−0.17 wt %.

12. The coated cutting tool according to claim 1, wherein the substoichiometric carbon content SCC in the cemented carbide is −0.28 wt %≤SCC≤−0.17 wt % and the cemented carbide comprises an eta phase in a volume fraction of between 2 and 10 vol %.

13. The coated cutting tool according to claim 12, wherein an average grain size of the eta phase is between 0.1 to 10 μm.

14. The coated cutting tool according to claim 1, wherein the cutting tool is a milling insert.

15. The coated cutting tool according to claim 1, wherein the one or more layers is a titanium metal carbide, titanium metal nitride or titanium metal carbonitride, wherein the titanium amount in the carbide, nitride or carbonitride is at most 10 at % of an amount of the total metal.

* * * * *